(12) United States Patent
Lu et al.

(10) Patent No.: US 10,659,790 B2
(45) Date of Patent: May 19, 2020

(54) CODING OF HDR VIDEO SIGNALS IN THE ICTCP COLOR FORMAT

(71) Applicant: Dolby Laboratories Licensing Corporation, San Francisco, CA (US)

(72) Inventors: Taoran Lu, Santa Clara, CA (US); Fangjun Pu, Sunnyvale, CA (US); Peng Yin, Ithaca, NY (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/094,201

(22) PCT Filed: Apr. 19, 2017

(86) PCT No.: PCT/US2017/028455
§ 371 (c)(1),
(2) Date: Oct. 16, 2018

(87) PCT Pub. No.: WO2017/184784
PCT Pub. Date: Oct. 26, 2017

(65) Prior Publication Data
US 2019/0098317 A1    Mar. 28, 2019

Related U.S. Application Data

(60) Provisional application No. 62/326,151, filed on Apr. 22, 2016.

(51) Int. Cl.
*H04N 19/149* (2014.01)
*H04N 19/124* (2014.01)
*H04N 19/186* (2014.01)
*H04N 19/115* (2014.01)
*H04N 19/12* (2014.01)

(52) U.S. Cl.
CPC ......... *H04N 19/149* (2014.11); *H04N 19/115* (2014.11); *H04N 19/12* (2014.11); *H04N 19/124* (2014.11); *H04N 19/186* (2014.11)

(58) Field of Classification Search
None
See application file for complete search history.

(56) References Cited

U.S. PATENT DOCUMENTS

2016/0323556 A1*  11/2016  Luginbuhl ............. G06T 5/007
2018/0007392 A1*  1/2018   Lasserre ................ H04N 19/98

OTHER PUBLICATIONS

Andersson K. et al. "Report for CE1.a (chroma QP)" 113 MPEG meeting Oct. 2015 Geneva, (Motion Picture Expert Group or ISO/IEC JTC1/SC29/WG11).

(Continued)

*Primary Examiner* — Dave Czekaj
*Assistant Examiner* — Samuel D Fereja

(57) ABSTRACT

Methods to improve the quality of coding high-dynamic range (HDR) signals in the ICtCp color space are presented. Techniques are described to a) generate optimum chroma Offset and scaling parameters, b) compute chroma mode decisions by optimizing mode selection distortion metrics based on chroma saturation and hue angle values, and c) preserving iso-luminance by maintaining in-gamut values during chroma down-sampling and chroma up-sampling operations.

5 Claims, 4 Drawing Sheets

(56) References Cited

OTHER PUBLICATIONS

Anonymous: "report ITU-R BT. 2390-0 High dynamic range television for production and international programme exchange BT Series broadcasting Service (television)", Apr. 11, 2016, XP055383019, Retrieved from internet: URL; https://www.itu.int/dms pub/itu-r/opb/rep/R-REP-BT. 2390-2016-PDF-E.pdf (retrieved on Jun. 20, 2017) Section 8.

Lu, T. et al. "Conversion and Coding Practices for HDR/WCG ICTCP 4:2:0 Video", 2017 Data Compression Conference (DCC), Cited by : Papers(2), IEEE Conferences, pp. 13-22.

Pu, F. et al. "AHG13: ICtCp Compression Using HEVC Main 10", 24 JCT-VC Meeting: May 26, 2016 to Jan. 6, 2016 Geneva: (Joint Collaborative Team on Video Coding of ISO/IEC JTCI/SC29/WG11 and ITU-TSG.16)M URL: http://wftp3. itu.int/av-arch/jctvc-site/, No. JCTVC-X0050, May 17, 2016 (May 17, 2016), XP030117979, Sectuib 2.

Ebner, F. et al "Development and Testing of a Color Space (IPT) with Improved Hue Uniformity" In color and Imaging Conference, vol. 1998, No. 1, pp. 8-13, Society for Imaging Science and Technology, 1998.

SMPTE Standard 2084:2014 "High Dynamic Range Electro-Optical Transfer Function of Mastering Reference Displays".

Samuelsson, Jonatan Conversion and Coding Practices for HDR/WCG Video, Draft 1, Joint Collaborative Team on Video Coding (JCT-VC) of ITU-T SG 16 WP 3 and ISO/IEC JTC 1/SC 29/WG 11 23rd Meeting: San Diego, USA, Feb. 19-26, 2016.

\* cited by examiner

CODING OF HDR VIDEO SIGNALS IN THE ICTCP COLOR FORMAT

CROSS-REFERENCE TO RELATED APPLICATIONS

This application claims the benefit of priority as a U.S. 371 national phase application from PCT International Application No. PCT/US2017/28455, filed Apr. 19, 2017, which claims the benefit of priority from U.S. Patent Application No. 62/326,151, filed on Apr. 22, 2016, each of which is hereby incorporated by reference in its entirety.

TECHNOLOGY

The present invention relates generally to images. More particularly, an embodiment of the present invention relates to the efficient coding of high-dynamic range (HDR) images and video signals in the ICtCp color format.

BACKGROUND

The legacy YCbCr color format is a color-opponent, non-constant luminance format, where signals are interpreted based on color differences in an opposing manner. In YCbCr and similar color-opponent formats (such as YUV) the goal is to separate luma from chroma information for the purposes of chroma subsampling (i.e., 4:2:2 and 4:2:0). Chroma sub-sampling reduces the amount of data required to represent an image without affecting perceptually overall picture quality. Separating color from luma has also been proven to yield coding advantages in a variety of image and video coding standards, such as JPEG, MPEG-1, MPEG-2, AVC, HEVC, and the like.

Recently, High dynamic range (HDR) and wide color gamut (WCG) content have revealed the limitations of existing color encoding methods. Errors that were previously small with standard dynamic range can become magnified. Report ITU-R BT.2390-0 (2016), "*High dynamic range television for production and international programme exchange,*" which is incorporated herein by reference in its entirety, provides an alternative method for color difference encoding which is based on the IPT color space originally developed by Ebner and Fairchild, and will be referred to as the ICtCp (or $IC_TC_P$) color format.

Like YCbCr, ICtCp is a color-opponent based encoding scheme intended to separate luma from chroma information. In addition, ICtCp offers constant intensity (CI) representation. The CI neutral (grey) axis is encoded with the SMPTE ST 2084 or Hybrid Log-Gamma (HLG) non-linearity functions to match the human visual system, and to optimize it for high dynamic range signal encoding. Starting from RGB or XYZ representations, color transformation matrices to the ICtCp color format have been optimized for the human visual system perception of HDR and WCG content.

Most of the existing video compression standards, such as MPEG-1, MPEG-2, AVC, HEVC, and the like, have been tested, evaluated, and optimized for gamma-coded images in the YCbCr color space; however, experimental results have shown that the ICtCp color format may provide a better representation for high-dynamic range images with 10 or more bits per pixel per color component. To improve existing coding standards, such as HEVC, as appreciated by the inventors here, improved techniques for the coding of video in the ICtCp color format are needed.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
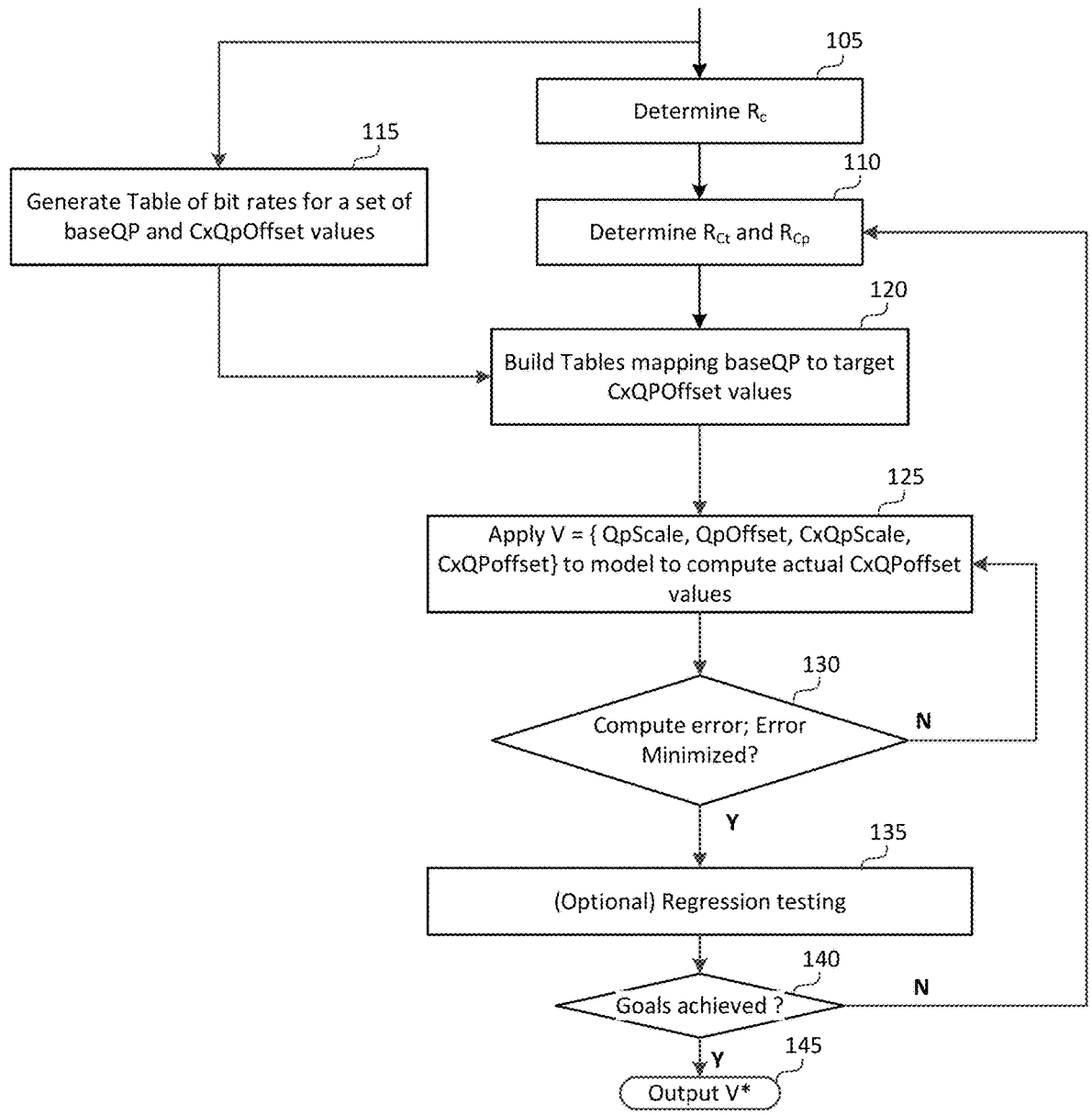
FIG. 1 depicts an example process for optimizing chroma QP offset parameters when coding ICtCp sequences.

Video coding of high dynamic range (HDR) images in the ICtCp color format is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods to optimize the encoding of high-dynamic range images in the ICtCp color format. In a video encoder, in one embodiment, in a method to generate chroma offset parameters for chroma quantization, a processor determines (105, 110) target chroma bit rates for a first chroma component and a second chroma component. For a chroma quantization model, given a set of model parameters comprising a luminance base quantization parameter (baseQP), a first subset of chroma offset parameters, and a second subset of chroma offset parameters, the processor sets the second subset of chroma offset parameters to zero, and for one or more video sequences, computes (115) actual chroma bit rates for one or more values of the baseQP parameter and one or more values of the first subset of chroma offset parameters. For the one or more video sequences, it computes (120) based on the target chroma bit rates an ideal mapping between the one or more values of the baseQP parameter and values of the first subset of chroma offset values. For values of the set of model parameters and based on the chroma quantization model, it generates (125) a target mapping between the one or more values of the baseQP parameter and values of the first subset of chroma offset values, and then generates an optimum set of model parameters by minimizing the error between the ideal mapping and the target mapping.

In a second embodiment, in a video encoder, in a method to improve chroma mode decision, a processor receives luminance and chroma pixel values of one or more pictures in a video sequence, wherein each chroma pixel value comprises a first chroma pixel value and a second chroma pixel value. It computes saturation and hue angle values for the chroma pixels based on the chroma pixel values, and it determines an output chroma mode based on a cost function comprising a cost parameter based on the saturation and hue angle values for the chroma pixels.

In a third embodiment, in a method to maintain constant luminance or iso-luminance during chroma processing of a video sequence, a processor receives input pixel values in a first color format (e.g., $R_0G_0B_0$). Converts the input pixel values from the first color format to first pixel values in a second color format (e.g., $I_0Ct_0Cp_0$ 4:2:0), wherein in the second pixel format a pixel value comprises a luma value, a first chroma value, and a second chroma value. Determines whether the chroma pixel values of the first pixel values in the second color format are within a specified color gamut, and for one or more chroma pixel values of the first pixel values in the second color format that are not within the specified color gamut generates adjusted chroma pixel values ($Ct_1Cp_1$) within the specified color gamut in the second color format, and generates output pixel values in the second color format comprising the luma values of the first pixel values and the adjusted chroma pixel values (e.g., $I_0Ct_1Cp_1$).

In a fourth embodiment, in a method to maintain constant luminance or iso-luminance during chroma processing of a video sequence, a processor receives input pixel values in a first color format (e.g., $R_0G_0B_0$), it converts the input pixel values from the first color format to first pixel values in a second color format (e.g., $I_0Ct_0Cp_0$ 4:2:0), wherein in the second pixel format a pixel value comprises a luma value and two chroma values. It converts the first pixels values in the second color format to second pixel values in the first color format (e.g., $R_1G_1B_1$). It converts the second pixel values in the first color format to second pixel values in the second color format (say $I_1Ct_1Cp_1$); and generates output pixel values in the second color format comprising the luma values from the first pixel values in the second color format and the chroma values from the second pixel values in the second color format (say, $I_0Ct_1Cp_1$).

Video Coding for High Dynamic Range (HDR) Video in $IC_TC_P$

THE $IC_TC_P$ Color Format

As discussed earlier, and as described in the ITU-R Report BT. 2390-0, the ICtCp color format is based in part on the IPT color space, which, is described in "*Development and testing of a color space (ipt) with improved hue uniformity*", by F. Ebner and M. D. Fairchild, in Proc. $6^{th}$ Color Imaging Conference: Color Science, Systems, and Applications, IS&T, Scottsdale, Ariz., November 1998, pp. 8-13 (to be referred to as the Ebner paper), which is incorporated herein by reference in its entirety. As described by the Ebner paper, IPT is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of a target display (e.g., 5,000 nits).

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example of a PQ mapping function is described in the SMPTE ST 2084:2014 specification, titled "*High Dynamic Range Electro-optical Transfer Function of Mastering Reference Displays*," Aug. 16, 2014, incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

$IC_TC_P$, also to be referred to as ICtCp, is a proposed new color format especially designed for processing high dynamic range and wide color gamut (WCG) signals. It combines IPT with PQ. I (Intensity) denotes the brightness of the PQ-encoded signal, $C_T$, Tritan Axis, corresponds to blue-yellow perception, and $C_P$, Protan Axis, corresponds to red-green color perception. In addition to the discussed features of IPT and PQ, in ICtCp:

chroma is rotated to align skin tones more closely to YCbCr color transformation matrices from XYZ to ICtCp are optimized for better uniformity and linearity for WCG images and improved isoluminance and stability with respect to HDR and WCG images.

As used herein, the term "isoluminance" refers to a measure of how well luminance (say, I of ICtCp or Y of YCbCr) correspond to true luminance. Indirectly, it measures how well a color space separates luma from chroma.

From an implementation point of view, using the ICtCp color space requires the same hardware and signal flow as using the traditional gamma-coded YCbCr.

Video Coding of ICtCp Signals

Embodiments described herein focus in improving the coding efficiency of HDR ICtCp signals as coded using the HEVC (also known as H.265) Main 10 Profile; however, a person skilled in the art of video coding would appreciate that the same methods are applicable to other AVC/HEVC Profiles, alternative codecs (e.g., VP9 and the like), and alternative color-opponent color spaces for coding high-dynamic range images.

Compared to the traditional gamma- or PQ-coded YCbCr 10-bit signals, experiments have indicated that 10-bit ICtCp signals have similar energy in the luma component but have significantly higher energy in the chroma components. Hence, using the existing coding tools, without taking into consideration the special nature of ICtCp signals, may result in significant rate increase for coding ICtCp signals.

Embodiments of the present invention address new encoding methods in the following areas: adjusting chroma quantization, chroma mode decision, and maintaining constant luminance. Each of these areas will be described in more detail next.

Chroma QP Offset Adjustments

As discussed in "*Report document to Core Experiment,*" by K. Andersson et al., m37179, ISO/IEC JTC1/SC29/WG11, October 2015, Geneva, which is incorporated herein by reference, for HDR 10-bit YCbCr (e.g., HDR10) content, in a typical HEVC encoder, given a quantization parameter (QP) to compress the luma (Y) component (baseQP), corresponding parameters for compressing chroma are given by $$CbOffset=clip3(-12,0,round(CbQpScale*(QpScale*baseQP+QpOffset)))$$

$$CrOffset=clip3(-12,0,round(CrQpScale*(QpScale*baseQP+QpOffset)))$$

$$Act\_CbQpOffset=clip3(-12,12,CbOffset+CbQpOffset),$$

$$Act\_CbQpOffset=clip3(-12,12,CrOffset+CrQpOffset) \quad (1)$$

where $Y=clip3(L1,L2,x)$ denotes a clipping function where $Y=L1$ if $x<L1$, $Y=L2$, if $x>L2$, and $Y=x$ otherwise. In current implementations, QpScale=−0.46, QpOffset=9.26, CbQpOffset=CrQpOffset=0. HDR10 encoding practices categorize content into two types based on their native gamut and use different values for the parameters CbQpScale and CrQpScale for deriving the chroma QP offset. For BT. 709 content, CbQpScale=1.14, and CrQpScale=1.79. For P3 content, CbQpScale=1.04, CrQpScale=1.39. These values provide a reasonable balance between performance and complexity of encoding configuration settings.

Given the computed CbOffset and CrOffset values, the Act_CbQpOffset and Act_CbQpOffset values are used at the slice level as the final chroma QP offset values. Given that ICtCp 10-bit signals have significantly higher energy in chroma components, the above parameters need to be re-tuned for the CtCp chroma components in order to reduce chroma bitrate, given the same quantization step. In one embodiment, one may simple change the CbQpOffset and CrQpOffset values to a non-zero constant value (e.g., 6.0) and reuse all other parameters as in YCbCr. Alternatively, FIG. 1 depicts an example process for optimizing the chroma QP offset parameters according to another embodiment.

As depicted in FIG. 1, given a sequence to be coded at a given bit rate (R) (e.g., R=20 Mbits/s), the process starts in step (105) by determining a chroma coding budget or bit rate ($R_c$) for the chroma components Ct and Cp. Such a budget may be computed based on prior experimental results when coding in YCbCr (that is, one would force the chroma budget in ICtCp to match the chroma budget in YCbCr), or it may be based on other transmission or storage constrains.

In parallel, in step (115), assuming QpScale=QpOffset=0, using a variety of representative clips, one may generate tables depicting the actual bit rate under a number of different values of CxQpOffset (where Cx represents Ct or Cp) and baseQP values (e.g., all possible baseQP values in [0, 51]). For example, Table 1 shows a bitrate table for the chroma components for four different clips, for values of baseQP in [19, 34], and CxQpOffset values ranging from 6 to 9. For example, for clip S0, for a baseQP=34, and CxQpOffset=6 for both Ct and Cp, the bit rates for the Ct and Cp components are 34.4 and 57.22 kbits/s respectively.

TABLE 1

| | | Chroma bit rate under various coding parameters | | | | | | | |
|---|---|---|---|---|---|---|---|---|---|
| | | CxQpOffset = 6 | | CxQpOffset = 7 | | CxQpOffset = 8 | | CxQpOffset = 9 | |
| | baseQP | Ct | Cp | Ct | Cp | Ct | Cp | Ct | Cp |
| S0 | 22 | 106.56 | 123.28 | 89.54 | 100.73 | 75.60 | 82.93 | 63.26 | 69.44 |
| | 29 | 57.75 | 72.98 | 48.36 | 61.07 | 40.88 | 50.64 | 35.54 | 41.60 |
| | 32 | 40.93 | 70.08 | 35.30 | 58.66 | 30.59 | 48.34 | 26.78 | 39.65 |
| | 34 | 34.40 | 57.22 | 30.04 | 46.96 | 26.06 | 38.65 | 23.10 | 32.18 |
| S1 | 22 | 225.93 | 169.27 | 195.47 | 146.50 | 171.81 | 128.96 | 149.61 | 114.37 |
| | 26 | 160.04 | 136.16 | 140.48 | 119.11 | 120.86 | 106.29 | 103.59 | 94.40 |
| | 29 | 135.58 | 114.59 | 116.94 | 102.62 | 99.72 | 90.98 | 86.25 | 79.40 |
| | 31 | 115.28 | 111.51 | 98.89 | 99.85 | 85.12 | 88.83 | 75.70 | 77.56 |
| S2 | 21 | 106.63 | 86.87 | 90.92 | 74.79 | 77.70 | 64.18 | 66.90 | 56.11 |
| | 25 | 70.13 | 59.00 | 60.57 | 51.32 | 52.05 | 44.59 | 44.71 | 38.96 |
| | 30 | 47.95 | 41.68 | 41.28 | 36.44 | 36.17 | 31.82 | 31.74 | 27.61 |
| | 34 | 34.78 | 35.01 | 30.69 | 30.61 | 27.80 | 26.67 | 25.10 | 23.66 |
| S3 | 19 | 99.30 | 65.50 | 83.00 | 56.01 | 69.47 | 48.59 | 57.44 | 41.37 |
| | 24 | 51.26 | 37.22 | 42.37 | 31.64 | 35.06 | 26.98 | 29.88 | 23.66 |
| | 28 | 32.46 | 29.21 | 27.58 | 24.93 | 23.68 | 21.71 | 20.77 | 19.34 |
| | 32 | 22.62 | 23.56 | 19.60 | 20.63 | 17.34 | 18.16 | 15.43 | 16.34 |

Given the total chroma budget $R_c$, in step (110) individual bit rates $R_{Ct}$ and $R_{Cp}$ for Ct and Cp are determined. The $R_{Ct}/R_{Cp}$ bitrate ratio may be obtained based on prior statistics or specific coding requirements. For example, in some embodiments, $R_{Ct}/R_{Cp}=1$, and $R_{Ct}=R_{Cp}=\frac{1}{2} R_c$. In a preferred embodiment, $R_{Ct}=30\%$ of $R_c$ and $R_{Cp}=70\%$ of $R_c$.

Given a list of $R_{Ct}$ and $R_{Cp}$ rates, using the precomputed tables from step (115) (e.g., Table 1), in step (120), one can create a new set of tables which for a given baseQP provide the best CxQpOffset values that yield the target bit rates. For example, from Table 1, for S1, for a target bit rate $R_{Ct}=R_{Cp}=100$ kbits/s, for baseQP=31, the recommended offsets are CtQpOffset=7 and CpQpOffset=7; however, for baseQP=29, the recommended offsets are CtQpOffset=8 and CpQpOffset=7. These data can be used to create a new Table as shown in Table 2 mapping baseQP values to the ideal CxQpOffset values (denoted as ct(i) and cp(i)) under the assumption that QpScale=QpOffset=0.

TABLE 2

Target mapping between baseQP and CxQpOffset values

| Clip | baseQP | CtQpOffset | CpQpOffset |
|---|---|---|---|
| S0 | QP(1) | ct(1) | cp(1) |
|  | QP(2) | ct(2) | cp(2) |
|  | ... | ... | ... |
|  | QP(n) | ct(n) | cp(n) |

Given equation (1), one may apply a similar adaptation model for ICtCp content, given as $$CtOffset = clip3(-12, 0, round(CtQpScale*$$
$$(QpScale*baseQP + QpOffset)))$$

$$CpOffset = clip3(-12, 0, round(CpQpScale*$$
$$(QpScale*baseQP + QpOffset)))$$

$$Act\_CtQpOffset = clip3(-12, 12, CtOffset + CtQpOffset)$$

$$Act\_CpQpOffset = clip3(-12, 12, CpOffset + CpQpOffset). \quad (2)$$

In practice, the QpScale and QpOffset values are not zero, so the challenge is to identify the optimum set (V*) of variables V={QpScale, QpOffset, CtQpScale, CpQpScale, CtQpOffset, and CpQpOffset} so that target CxQpOffset values and actual CxQpOffset values are as close as possible. For example, for QpScale=−0.46, QpOffset=10, CtQpOffset=5, and CtQpScale=1, from equation (2), for different values of baseQP (denoted as QP(i)), $$CtOffset(i) = clip3(-12, 0, round((-0.46*QP(i)+10)))$$

$$ct'(i) = Act\_CtQpOffset = clip3(-12, 12, CtOffset(i)+5).$$

Let ct(i), and cp(i), for i=1, 2, . . . , n, denote the target CxQpOffset values, for example, as computed in step (120) (e.g., Table 2). Let ct'(i), and cp'(i), for i=1, 2, . . . , n, denote computed values for a given set of variables V={QpScale, QpOffset, CtQpScale, CpQpScale, CtQpOffset, and CpQpOffset}. Let $$D_{Ct} = \Sigma_{QP(i)} |ct(i) - ct'(i)|,$$

$$D_{Cp} = \Sigma_{QP(i)} |cp(i) - cp'(i)|, \quad (3)$$

denote a measure of error, then the optimum set V* can be found to be the set of V values for which the cumulative error $D_{Ct}+D_{Cp}$ is minimized. In practice, one may start with the V values used in YCbCr, and then iterate over all (or a subset of) possible legal values to identify the set that minimizes the total error. This process is depicted in FIG. 1 as steps (125) and (130).

The optimal V* set can be generated at the sequence level (that is, the best set of values for a given sequence), or for a family of sequences, for example for BT 709 content or P3 content. An example of such a set of values for BT. 709 and P3 is given in Table 3.

TABLE 3

Suggested Chroma QP offset parameters for HDR ICtCp

| Type | QpScale | QpOffset | CtQpScale | CpQpScale | CtQPoffset | CpQPoffset |
|---|---|---|---|---|---|---|
| 709 | −0.46 | 10 | 0.9 | 1.6 | 6 | 6 |
| P3 | −0.46 | 10 | 0.5 | 0.9 | 8 | 7 |

Given the optimum V* set (e.g., Table 3) and Table 2, in step (135) one may apply optional regression testing on a variety of test sequences to measure the performance of the selected parameters and decide if further fine-tuning is required. For example, in step (140), one may test whether a) the total bandwidth is similar or lower than past practices using YCbCr, b) whether the subjective quality is the same or better as in YCbCr HDR10 encoding, and c) whether the objective quality meets expectations. If any of these tests fail, then optionally, one may adjust the $R_{Ct}/R_{Cp}$ ratio in step (110) to generate a new set of parameters. Experiments by the inventors indicate that the proposed parameters in Table 3 meet all of the above requirements.

Chroma Mode Decision in ICtCp

In a typical encoder design, the coding mode is usually selected by minimizing a cost function, such as $$J = D + \lambda R, \quad (4)$$

where D denotes a measured distortion, say, the inter-plane mean square error (MSE) or the sum of absolute differences (SAD).

Figure 2:
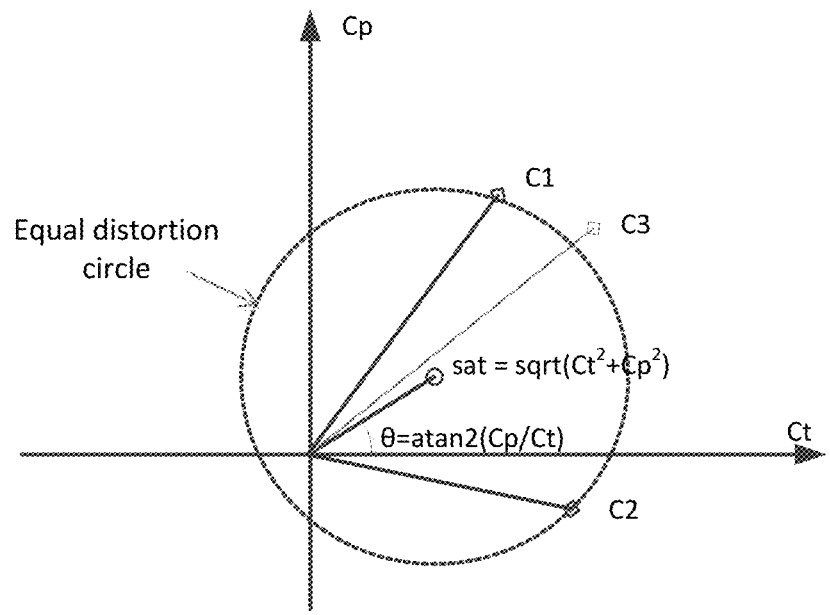
FIG. 2 depicts an example of computing hue and saturation in ICtCp according to an embodiment of this invention for Chroma mode selection.

Under current practice (e.g., assuming input is in YCbCr), without taking into consideration the fact that the input is in ICtCp, the cost function for chroma mode selection may be expressed as $$J_{CbCr} = J_{Cb} + J_{Cr} = (D_{Cb} + D_{Cr}) + \lambda(R_{Cb} + R_{Cr}), \quad (5)$$

where the costs $D_{Cb}$ and is $D_{Cr}$ are computed within each chroma plane. Experimental results have demonstrated that such a model may lead to a non-optimal mode decisions since chroma distortions may change saturation and hue in the reconstructed color. Under the current mode decision model, two mode candidates (e.g., points C1 and C2 in FIG. 2) having the same distortion $D = (D_{Cb}+D_{Cr})$ (e.g., equal MSE) can have dramatically different hue and saturation for ICtCp content, therefore completely different perceived color distortion. The candidate having smaller D (which will be selected as best candidate by the current algorithm) may end up with larger hue or saturation change (point C2 vs. C3 on FIG. 2), resulting in worse subjective quality.

Given the fact that ICtCp color space is featuring constant hue lines, the saturation (sat) and hue angle (θ) can be easily computed under this space as:

$$sat = \sqrt{C_T^2 + C_P^2}, \quad (6)$$

$$\theta = a\tan2\left(\frac{C_P}{C_T}\right),$$

where $C_T$ and $C_P$ are normalized values in range [−0.5 0.5] and atan 2( ) is defined as $$a\tan2\left(\frac{y}{x}\right) = \begin{cases} \arctan\left(\frac{y}{x}\right) & x > 0 \\ \arctan\left(\frac{y}{x}\right) + \pi & y \geq 0, x < 0 \\ \arctan\left(\frac{y}{x}\right) - \pi & y < 0, x < 0 \\ +\frac{\pi}{2} & y > 0, x = 0 \\ -\frac{\pi}{2} & y < 0, x = 0 \\ 0 & y = 0, x = 0 \end{cases},$$

and arctan( ) is the standard inverse tangent function with output value range in $$\left[-\frac{\pi}{2}, \frac{\pi}{2}\right],$$

so atan 2( ) has output value θ range in (−π/π).

In an embodiment, the chroma mode decision is based on minimizing the error measured for hue and saturation, for example, given by the cost function $$J_{CtCp} = D_{CtCp} + \lambda(R_{Ct} + R_{Cp}),$$

where $$D_{CtCp} = w_1 D_{sat} + w_2 D_\theta, \quad (7)$$

where $w_1$ and $w_2$ denote weight factors. In an embodiment these weights may add to 1. Let $\widehat{sat}$ and $\hat{\theta}$ denote the reconstructed sat and θ values, in an embodiment, the distortion in equation (7) may be computed as $$D_{sat} = \text{abs}\left(\log 10\left(\frac{\widehat{sat}}{sat}\right)\right) \quad (8)$$

$$D_\theta = \begin{cases} \frac{t}{\pi}, & t \leq \pi \\ \frac{2*\pi - t}{\pi}, & t > \pi \end{cases},$$

where $$t = |(\theta - \hat{\theta})|,$$

and $$w_1 = \frac{1}{4}, w_2 = \frac{3}{4}.$$

In an embodiment, luma information can also be used to assist in determining a chroma mode. For example, let f(I) denote a function of the co-located I (luma) component, then equation (7) may be modified as $$D_{CtCp} = w_1 D_{sat} + w_2 D_\theta + w_3 f(I). \quad (9)$$

For example, f(I) could be a Gaussian function:

$$f(I) = e^{-\frac{(I-\mu)^2}{2\sigma^2}},$$

and $$w_1 = \frac{1}{5}, w_2 = \frac{3}{5}, w_3 = \frac{1}{5}.$$

Constant luminance issue in Chroma Resampling and Mode Decision

Luminance (typically denoted as CL_Y) is determined via a linear combination of RGB values. For example, using Rec. BT. 2020,

CL_Y=0.2627*R+0.6780*G+0.0593*B,

PQ_CL_Y=PQ(CL_Y)  (10)

where R, G, and B are linear RGB values (that is, without any gamma or PQ mapping). PQ(.) is function of PQ mapping.

Maintaining constant luminance can reduce the error propagation from chroma to luma channels, therefore it is helpful in chroma resampling, such as 4:2:2 and 4:2:0 formats. The HEVC Main 10 profile uses a 4:2:0 color sampling format which can benefit from constant luminance. The I channel in ICtCp corresponds very closely to CL_Y luminance; however, in some critical test patterns or colors, pre/post processing in ICtCp may still exhibit luminance issues. As used herein, in the context of chroma resampling, the term 'pre-processing' refers to 4:4:4 to 4:2:0 conversion, and the term 'post-processing' refers to 4:2:0 to 4:4:4 conversion. After compression, the decoded signal can be modified even further; therefore any changes of luminance during coding can be further magnified. In this invention, improved coding may be achieved by maintaining constant luminance. There are two places one can address the luminance issue: a) during pre/post processing, especially in 4:2:0 and 4:4:4 conversion, and 2) during the luma mode decision.

Figure 3:
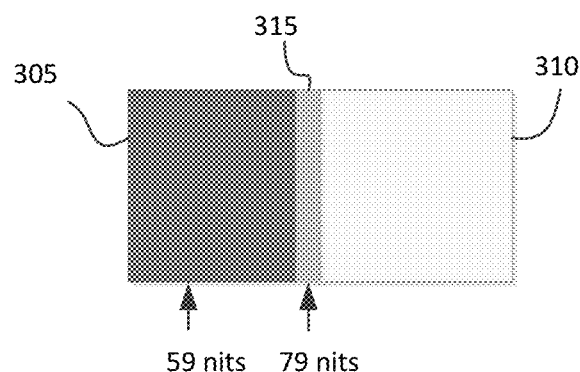
FIG. 3 depicts an example of observable broken iso-luminance when operating in the ICtCp color space due to chroma clipping.

FIG. 3 depicts an example of a test pattern consisting of a step transition from a pure blue color (305) patch to a pure green color (310) patch, at 1000 nits in the RGB color space, after color reconstruction following chroma sub-sampling and chroma up-sampling. The simplified color conversion process to generate FIG. 3 is described as follows:

Convert source $R_0G_0B_0$ data to $I_0Ct_0Cp_0$ 4:4:4 data

Convert $I_0Ct_0Cp_0$ 4:4:4 data to $I_0Ct_0Cp_0$ 4:2:0 data via chroma sub-sampling Assume a coding process to receive $I_0Ct_0Cp_0$ 4:2:0 data Convert $I_0Ct_0Cp_0$ 4:2:0 to $I_0Ct_0Cp_0$ 4:4:4 via chroma up-sampling Convert $I_0Ct_0Cp_0$ 4:4:4 to $R_1G_1B_1$ (with an ICtCp representation of ($I_1Ct_1Cp_1$))

As depicted in FIG. 3, when observing the reconstructed RGB data ($R_1G_1B_1$), one may notice that to the left of the edge between blue and green, in pixel region (315) (note: pixel regions are not drawn in scale), luminance values change from the typical 59 nits in most of the blue area (305) to about 79 nits. This rate of luminance change, denoted as dL/L (e.g., dL/L=(79−59)/59), is about 33%, and it is observable on an HDR display.

Figure 4:
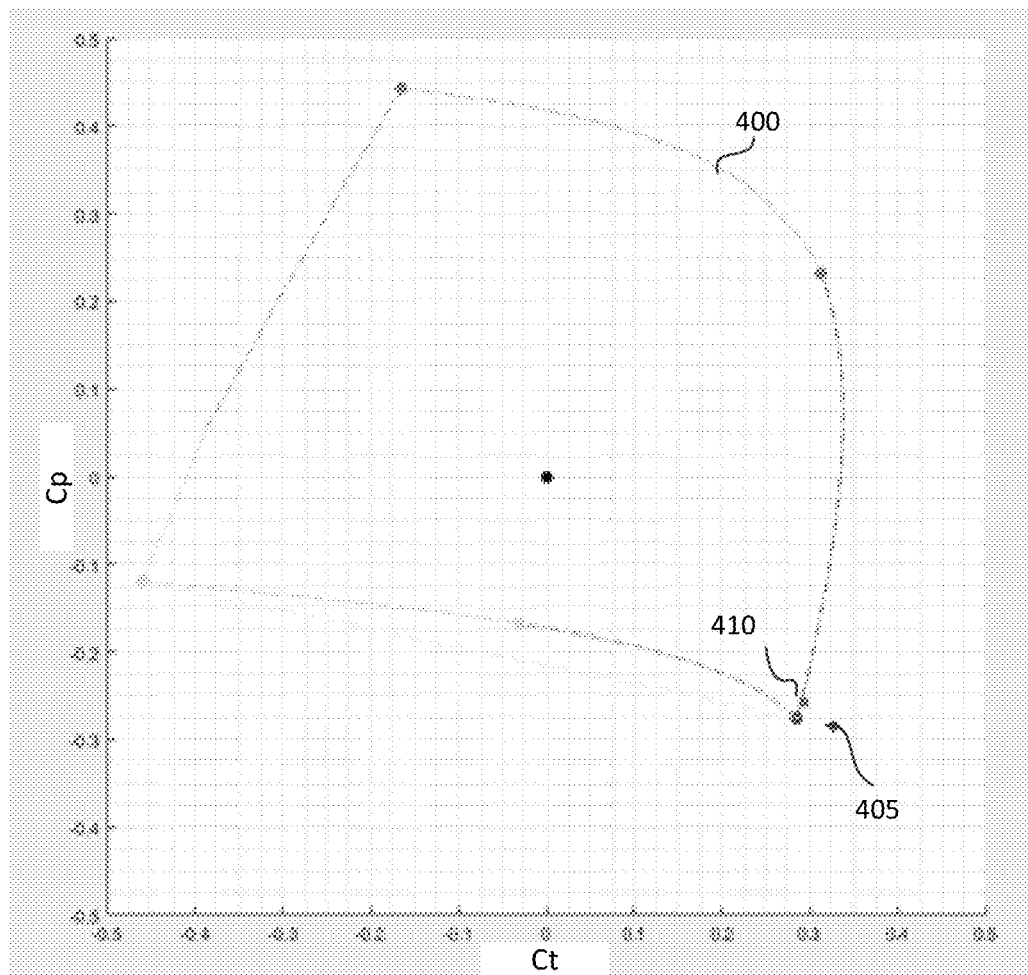
FIG. 4 depicts an example of chroma gamut mapping in the ICtCp color space.

For pixels in (315), when converting from $R_1G_1B_1$ to $I_1Ct_1Cp_1$, the intensity values between $I_0$ and $I_1$ will be different. This is better explained using FIG. 4, which depicts in more detail the CtCp color gamut (400) and how some colors may be clipped. During the chroma resampling process, certain $Ct_0Cp_0$ values (e.g., 405) may become invalid (e.g., be outside of the color boundary (400)); however, after the CtCp to RGB color conversion, the final RGB value will be clipped to a valid (in-gamut) $R_1G_1B_1$ value (410). If one computes the ICtCp value (e.g., $I_1Ct_1Cp_1$) corresponding to this $R_1G_1B_1$ (410) value, the converted ICtCp values are still valid; however, the intensity and chroma values between $I_0Ct_0Cp_0$ and $I_1Ct_1Cp_1$ will be different.

To maintain fixed intensity (e.g., $I_1=I_0$), one needs to make sure all CtCp values are always in gamut during both pre- and post-processing. In a first embodiment, constant intensity is maintained using RGB conversion and clipping. For example, first, $I_0Ct_0Cp_0$ is converted from 4:2:0 to 4:4:4 and to RGB, then it is converted back to $I_1Ct_1Cp_1$, but $I_1$ is replaced with $I_0$, so that its final ICtCp value is $I_0Ct_1Cp_1$.

Figure 5:
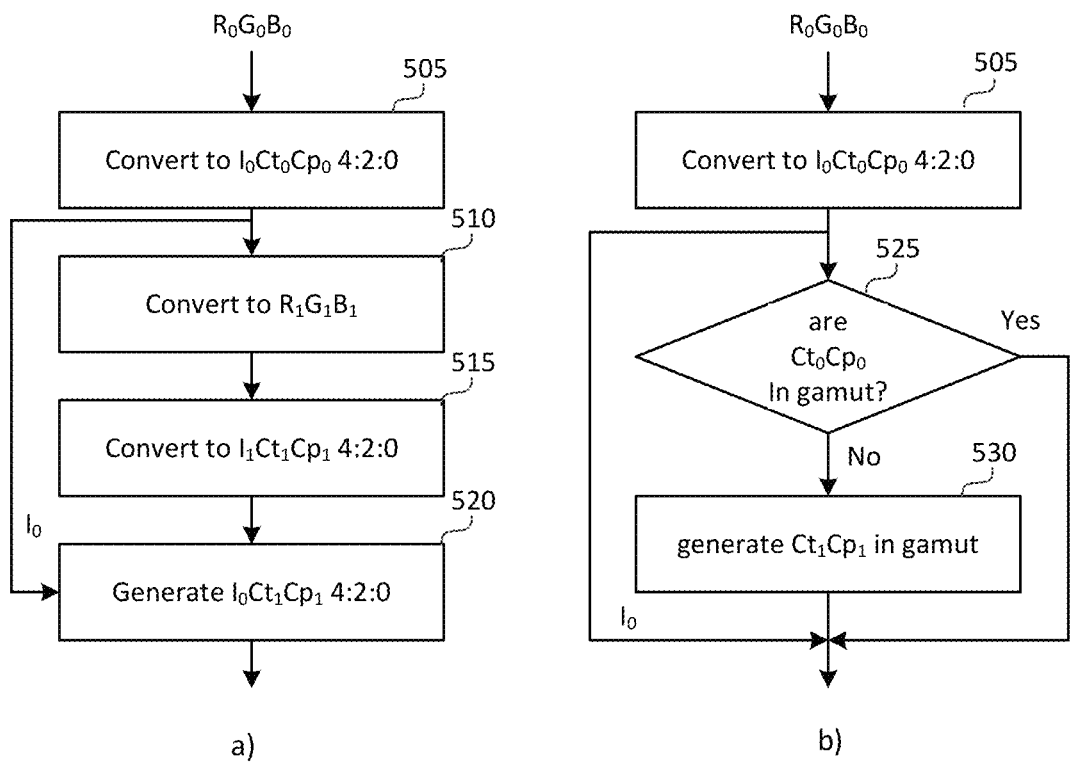
FIG. 5 depicts example processes to maintain iso-luminance during ICtCp chroma processing according to embodiments of this invention.

An example process according to this embodiment is depicted in FIG. 5 a):

In step (505), convert source $R_0G_0B_0$ data to $I_0Ct_0Cp_0$ 4:2:0 data

In step (510), convert $I_0Ct_0Cp_0$ 4:2:0 data to $R_1G_1B_1$ data

In step (515), convert $R_1G_1B_1$ to $I_1Ct_1Cp_1$ 4:2:0

In step (520), combine $I_0$ from step (505) and $Ct_1Cp_1$ from step (515) to generate $I_0Ct_1Cp_1$ in 4:2:0

Since in ICtCp space constant intensity correlates very well with constant luminance, after coding and decoding, one may convert $I_0Ct_1Cp_1$ to RGB to generate $R_2G_2B_2$ without any of the iso-luminance issues depicted in FIG. 3.

In a second embodiment, one operates on the chroma $Ct_0Cp_0$ values directly. For example, one may modify the saturation of CtCp values until CtCp is located inside the gamut boundary, to be denoted as $Ct_1Cp_1$. For example, let $$sat_1 = sat_0 * \alpha, \quad (11)$$

where sat denotes the saturation as computed in equation (6), and $\alpha$ is a scaling factor to produce valid $Ct_1Cp_1$ values. Given $sat_1$, the modified chroma values are given by $$Ct_1 = sat_1 * \cos(\theta), \text{ and}$$

$$Cp_1 = sat_1 * \sin(\theta). \quad (12)$$

Alternatively, one may also apply lookup tables or other known in the art gamut mapping techniques to compute the valid (in gamut) $Ct_1Cp_1$ values. These methods can be applied in either chroma pre-processing or chroma post-processing or both.

An example process according to this embodiment is depicted in FIG. 5 b).

In step (505), convert source $R_0G_0B_0$ data to $I_0Ct_0Cp_0$ 4:2:0 data

In step (525), check whether the chroma data are valid (within gamut), if they are, no more processing is required, if not, then In step (530), generate in-gamut $Ct_1Cp_1$ values, e.g., using equations (11) and (12), look-up tables, or other color mapping techniques. These in-gamut chroma values will be combined with $I_0$ from step (505) to generate $I_0Ct_1Cp_1$ in 4:2:0.

Even though the I channel in ICtCp corresponds very closely to constant luminance CL_Y, I does not match 100% constant luminance and in some cases it is not fully decorrelated with the chroma Ct and Cp channels. In those cases, even though one maintains the $I_0$ values in the full chroma resampling conversion chain, one may still find that the luminance changes. As an example, this behavior can be demonstrating by using the same pattern as in FIG. 3, but now with a blue and a black patch. Using this test pattern, some interpolated (reconstructed) pixels show again higher luminance than the original source data. To address this issue, one can modify the I channel so the final reconstructed CL_Y value is much closer to the original CL_Y value. There are several ways to do that: 1) One may apply exhaustive search using a similar method as discussed in Jonatan Samuelsson's, "Conversion and Coding Practices for HDR/WCG Video, Draft 1," JCTVC-W1017, ISO/IEC JTC 1/SC 29/WG 11, San Diego, Calif., February 2016, which is incorporated herein by reference in its entirety. 2) Since the I channel is very close to the perceptually-quantized value of CL_Y (PQ_CL_Y), one may only need to perform a small refinement. In one embodiment, a search range to adjust I can be set adaptively based on the difference between I and PQ_CL_Y. 3) One only needs to modify pixels which will be visible. For example, one can detect pixels for which dL/L is higher than a visibility threshold or that the Delta-E 2000 error is more than 1. One can also combine the above methods. It is preferred that corrected CtCp values are used during intensity adjustments. In one embodiment, CtCp adjustments precede the I adjustment.

In some cases, one might also get saturation or hue mismatch from chroma resampling. Because the I channel is orthogonal to the chromatic Ct and Cp channels, one can work independently on the chroma channels to fix saturation or hue issues.

In an embodiment, an example process to adjust chrominance and luminance issues due to chroma sampling could be:

Convert source $R_0G_0B_0$ data to $I_0Ct_0Cp_0$ 4:4:4 data

Convert $I_0Ct_0Cp_0$ 4:4:4 data to $I_0Ct_0Cp_0$ 4:2:0 data via chroma sub-sampling Adjust $Ct_0Cp_0$ to fix chrominance issues (e.g., due to hue/saturation/gamut boundaries) and/or adjust $I_0$ to fix luminance issue (using source data as a reference); generate corrected $I_1Ct_1Cp_1$ 4:2:0 data Assume an encoding/decoding process to receive $I_1Ct_1Cp_1$ 4:2:0 data Convert $I_1Ct_1Cp_1$ 4:2:0 to $I_1Ct_1Cp_1$ 4:4:4 via chroma up-sampling Adjust $Ct_1Cp_1$ to fix chrominance issues (e.g., due to hue/saturation/gamut boundaries) and/or adjust $I_1$ to fix luminance issue (without a source reference); generate corrected reconstructed ICtCp 4:4:4

Convert corrected reconstructed ICtCp 4:4:4 data into $R_1G_1B_1$

During the encoding mode decisions, it is preferable to maintain the I value as close as possible to the original luminance (CL_Y). As explained above, this requires to maintain valid in-gamut CtCp values. In an example embodiment, chroma distortion (e.g., using equations (7) and (8)) may be computed using gamut-corrected $Ct_1Cp_1$ values instead of the original $Ct_0Cp_0$ values. Thus, techniques to preserve iso-luminance may be combined with techniques used for luma and chroma mode decisions.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to video coding of HDR video in ICtCp format, such as those described herein. The computer and/or IC may compute any of a variety of parameters or values that relate to video coding of HDR video in ICtCp format processes described herein. The image and video embodiments may be implemented in hardware, software, firmware and various combinations thereof.

Certain implementations of the invention comprise computer processors which execute software instructions which cause the processors to perform a method of the invention.

For example, one or more processors in a display, an encoder, a set top box, a transcoder or the like may implement methods related to video coding of HDR video in ICtCp format as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient video coding of HDR video in ICtCp format are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to maintain constant luminance or isoluminance during chroma processing of a video sequence, the method comprising:

receiving input pixel values in a first color format;

converting the input pixel values from the first color format to first pixel values in a second color format, wherein in the second color format a pixel value comprises a luma value, a first chroma value, and a second chroma value;

determining whether first chroma values or second chroma values of the first pixel values in the second color format are within a specified color gamut, and for one or more chroma pixel values of the first pixel values in the second color format that are not within the specified color gamut:

generating adjusted chroma pixel values within the specified color gamut in the second color format, wherein generating the adjusted chroma pixel values comprises:

for a chroma pixel value outside of the specified color gamut:

computing a saturation value and a hue angle value based on the first chroma value and the second chroma value of the chroma pixel;

generating a scaled saturation value based on the saturation value, wherein the scaled saturation value is within the specified color gamut; and adjusting the first chroma value and the second chroma value based on the scaled saturation value and the hue angle value to generate an adjusted first chroma value and an adjusted second chroma value, wherein generating the adjusted first and second chroma pixel values ($Ct_1$, $Cp_1$) comprises computing $Ct_1 = sat_1 * \cos(\theta)$, and $Cp_1 = sat_1 * \sin(\theta)$, where $\theta$ denotes the hue angle value for the chroma pixel and sats denotes the scaled saturation value of the chroma pixel; and generating output pixel values in the second color format comprising the luma value of the first pixel values and the adjusted chroma pixel values.

2. The method of claim 1, wherein generating the scaled saturation value ($sat_1$) comprises computing $sat_1 = sat_0 * \alpha$, where $sat_0$ denotes the saturation value, and $\alpha$ is a scaling factor.

3. The method of claim 1, further comprising performing chroma mode decisions based on the adjusted chroma pixel values.

4. An apparatus comprising a processor and configured to perform the method recited in claim 1.

5. A non-transitory computer-readable storage medium having stored thereon computer-executable instructions for executing with a processor a method in accordance with claim 1.

* * * * *